United States Patent [19]

Nakamura et al.

[11] Patent Number: 5,424,855
[45] Date of Patent: Jun. 13, 1995

[54] CONTROL CIRCUIT FOR ARRAY OF LIGHT-EMITTING DIODES

[75] Inventors: Yukio Nakamura; Kazuo Tokura; Shigemitsu Horikawa; Tokio Sato, all of Tokyo, Japan

[73] Assignee: Oki Electric Industry Co., Ltd., Tokyo, Japan

[21] Appl. No.: 238,839

[22] Filed: May 4, 1994

[30] Foreign Application Priority Data

May 14, 1993 [JP] Japan .................... 5-113389

[51] Int. Cl.6 .............. H04N 1/028; H04N 1/03
[52] U.S. Cl. .................... 358/472; 358/482; 250/208.1
[58] Field of Search ............... 358/472, 482, 494, 474, 358/471; 250/208.1; 257/443, 461

[56] References Cited

U.S. PATENT DOCUMENTS 4,424,523  1/1984  Snelling et al. ............. 358/472
4,424,524  1/1984  Daniele ...................... 358/472

FOREIGN PATENT DOCUMENTS 58-157252A  9/1983  Japan .

Primary Examiner—Scott A. Rogers
Attorney, Agent, or Firm—Spencer, Frank & Schneider

[57] ABSTRACT

An array of LEDs is controlled by a control circuit so as to emit light in a write mode and sense light in a read mode. In the read mode, each LED is alternately charged for a first interval, then allowed to discharge by flow of photocurrent for a second interval. At the end of the second interval, just before charging of the LED begins again, the anode voltage of the LED is read by coupling the anode of the LED to an output terminal for a third interval. The third interval of each LED may coincide with the first interval of the preceding LED in tile array, so that each LED is read while the preceding LED is being charged.

26 Claims, 10 Drawing Sheets 5,424,855

CONTROL CIRCUIT FOR ARRAY OF LIGHT-EMITTING DIODES

BACKGROUND OF THE INVENTION

This invention relates to a read-out method and control circuit for a light-sensing and light-emitting diode array that operates in both a read mode for scanning documents and a write mode for printing.

Facsimile machines and other devices that must both scan and print can employ an electrophotographic printing technique in which a latent image is created by illuminating the surface of a photosensitive drum. The latent image is developed by applying toner, then transferred to paper. The light source that illuminates the photosensitive drum may be an array of light-emitting diodes (LEDs). The array can also be biased so as to function as an array of light-sensing diodes. The same LED array can thus provide both the light needed to create printable images in write mode, and the light-sensing capability needed for scanning documents in read mode.

In read mode, the array can be read by detecting charges stored in the capacitances of the pn junctions of the LEDs. This is conventionally done by charging the LEDs in turn through a resistor and sensing the peak voltage produced by the charging current for each diode. This conventional method produces an output waveform that swings from ground level up to a peak voltage and then back to ground again as each LED is read.

One disadvantage of this conventional method of reading an LED array is that it produces a weak, but rapidly-varying signal. To convert this signal to suitable input for an analog-to-digital converter, the signal must be amplified by several high-speed operational-amplifier stages. Moreover, since it is the peak values of the output signal that are significant, a peak-detecting circuit is necessary. The control circuitry thus requires a large number of expensive peripheral circuits.

Another disadvantage of tile conventional method is that, since the LED array usually consists of a plurality of monolithic semiconductor chips, with a corresponding plurality of monolithic integrated control circuits mounted on a printed wiring board, the weak output signals from the control circuits are easily distorted as they travel through printed wiring traces on the board to a common output terminal. The distortion can be produced by the stray inductance and capacitance of the wiring traces, and by electromagnetic noise.

SUMMARY OF THE INVENTION

It is accordingly an object of the present invention to control an LED array in a read mode and a write mode without requiring expensive, high-speed operational amplifiers or peak-detecting circuits in the read mode.

Another object of the invention is to avoid waveform distortion and noise in the read mode.

According to the invention, in read mode, each LED in the array is alternately charged for a first interval, then allowed to discharge by flow of photocurrent for a second interval. All first intervals are of equal length, all second intervals are of equal length, and the first intervals of different LEDs are non-overlapping.

At the end of the second interval, just before charging of the LED begins again, the anode voltage of the LED is detected by coupling the anode of the LED to an output terminal For a third interval. A buffer amplifier may be provided to amplify the anode voltages before output at the output terminal.

DETAILED DESCRIPTION OF THE INVENTION

Embodiments of the invention will be described with reference to the attached drawings. These drawings illustrate the invention but do not restrict its scope, which should be determined solely from the appended claims.

Figure 1:
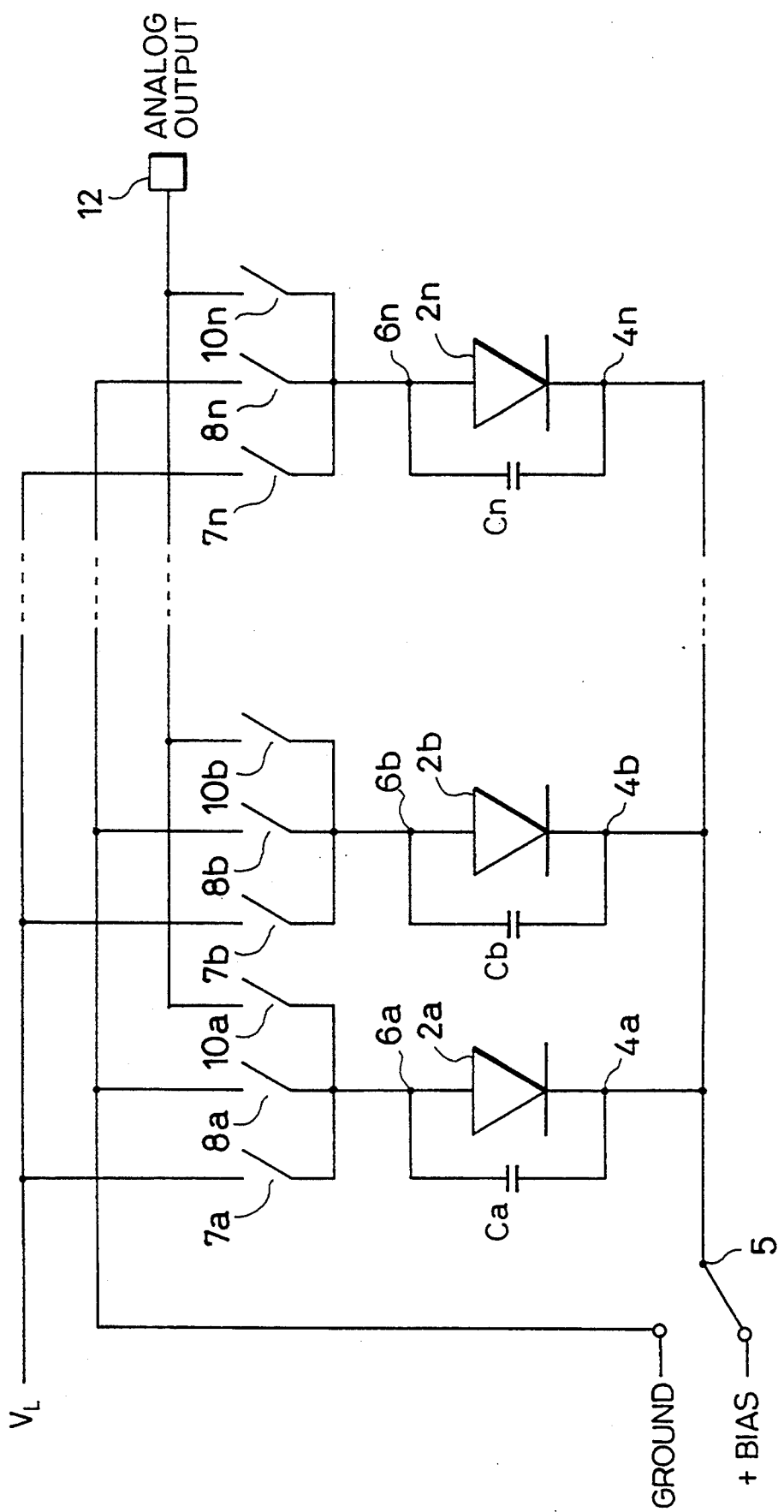
FIG. 1 is a schematic diagram illustrating the general configuration of the invented control circuit.

FIG. 1 is a schematic diagram of an array of LEDs, identified by reference numerals 2a, 2b . . . 2n, and the invented control circuit, showing only the interconnections of its switching elements. To avoid obscuring the invention with cluttered notation, in the following description the letter suffixes will generally be dropped, it being understood that an LED 2 refers to any one of the LEDs 2a, 2b, . . . . 2n. The same convention will be followed with other reference numerals. The letter n will also be used to refer to the number of LEDs 2 in the array.

The cathodes 4 of the LEDs 2 are coupled in common to a switch 5 that can selectively supply a ground potential or a positive bias potential. The anodes 6 of the LCDs 2 are coupled to respective first switching elements 7, second switching elements 8, and third switching elements 10. The first switch tag elements 7 are coupled in common to a source that supplies an LED driving potential $V_L$. The second switching elements 8 are coupled in common to the ground potential. The third switching elements 10 are coupled in common to an output terminal 12.

In write mode, switch 5 is set to the ground position (the upper position in the drawing), so that the cathodes 4 of all LEDs 2 are grounded. The third switching elements 10 of all LEDs 2 are switched off. If an LED 2 is to be lit, its first switching element 7 is switched on, supplying the driving potential $V_L$ to the anode 6 of the LED, while its second switching element 8 is switched off. The LED 2 is thus forward-biased, and emits light. If an LED 2 is to be extinguished, its first switching element 7 is switched off and its second switching element 8 is switched on, grounding the anode 6 of the LED 2. Since the cathode 4 and anode 6 of the LED 2 are both at ground potential, no current flows through the LED and no light is emitted.

In read mode, switch 5 is set to the bias position, as shown in the drawing, supplying a positive bias potential to the cathodes 4 of all LEDs 2, and the first switching elements 7 of all the LEDs are switched off. In this state the LEDs 2 are reverse-biased, hence substantially non-conducting; each LED 2 acts as a capacitor. The capacitances of the reverse-biased LEDs 2 are indicated by the symbols Ca, Cb, . . . Cn.

Reading of the LED array will be described with reference to FIG. 2, which illustrates anode voltages of the first three LEDs 2a, 2b, and 2c in tile array during three successive scans, and the voltage at the output terminal 12. The pulse waveforms in FIG. 2 indicate when the second and third switching elements 8 and 10 are on and off.

The second and third switching elements 8 and 10 of each LED are controlled the following way. With the third switching element 10 switched off, the second switching element 8 is switched on for a first interval, to charge the capacitance of the LED. During this interval the anode voltage of the LED falls quickly to ground, while its cathode remains at the positive bias potential.

Next the second switching element 8 is switched off for a second interval. During this second interval, if the LED 2 is illuminated, it conducts photocurrent in proportion to the intensity of the incident light, and this current slowly discharges the capacitance of the LED. The anode voltage accordingly rises slowly, as shown. At the end of the second interval the second switching element 8 is switched on again to start another first interval and recharge the capacitance of the LED. First and second intervals continue to alternate in this way.

In the final portion of tile second interval, just before another first interval begins, the third switching element 10 is is switched on to read the anode voltage, which indicates the amount of illumination received during the second interval. The anode voltage of the LED is provided through the third switching element 10 as an analog voltage to the output terminal 12.

The first (charging) intervals of different LEDs 2 are staggered so that they do not overlap. In FIG. 2 the first (charging) interval of LED 2a coincides with the third (read-out) interval of LED 2b. Similarly, the first (charging) interval of LED 2b coincides with the third (read-out) interval of LED 2c. The same pattern continues, the charging interval of each LED coinciding with the readout interval of the next LED.

Figure 2:
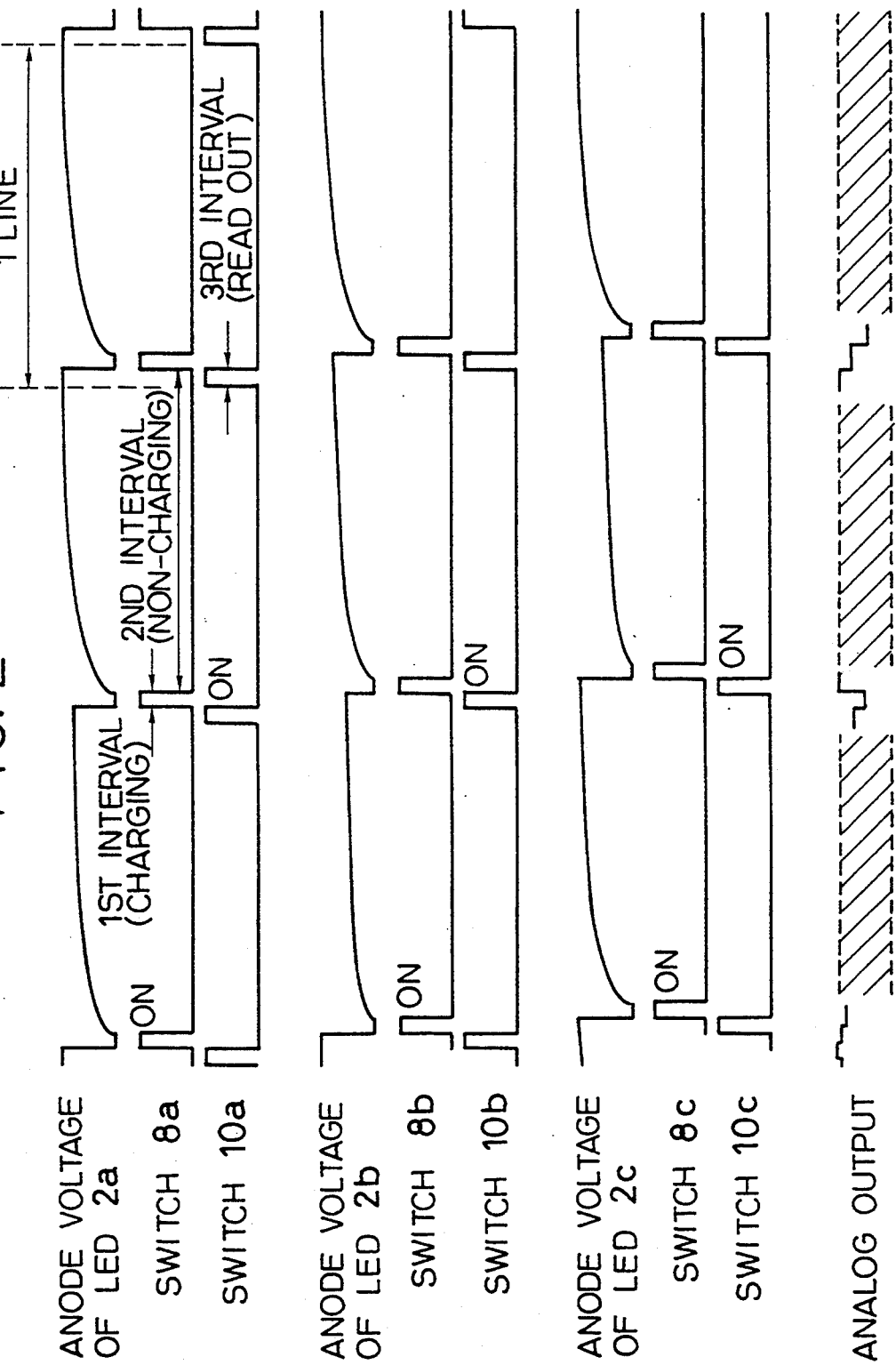
FIG. 2 is a timing diagram illustrating the invented method of reading signals from all LED array.

As can be seen at the bottom of FIG. 2, in a given read-out interval the output signal does not swing between ground level and a peak voltage, as in the prior art, but remains at a substantially constant level. Accordingly, no peak-detecting circuit is necessary to read the output voltage.

Next a more detailed description of an embodiment of tile invented control circuit will be given.

Figure 3:
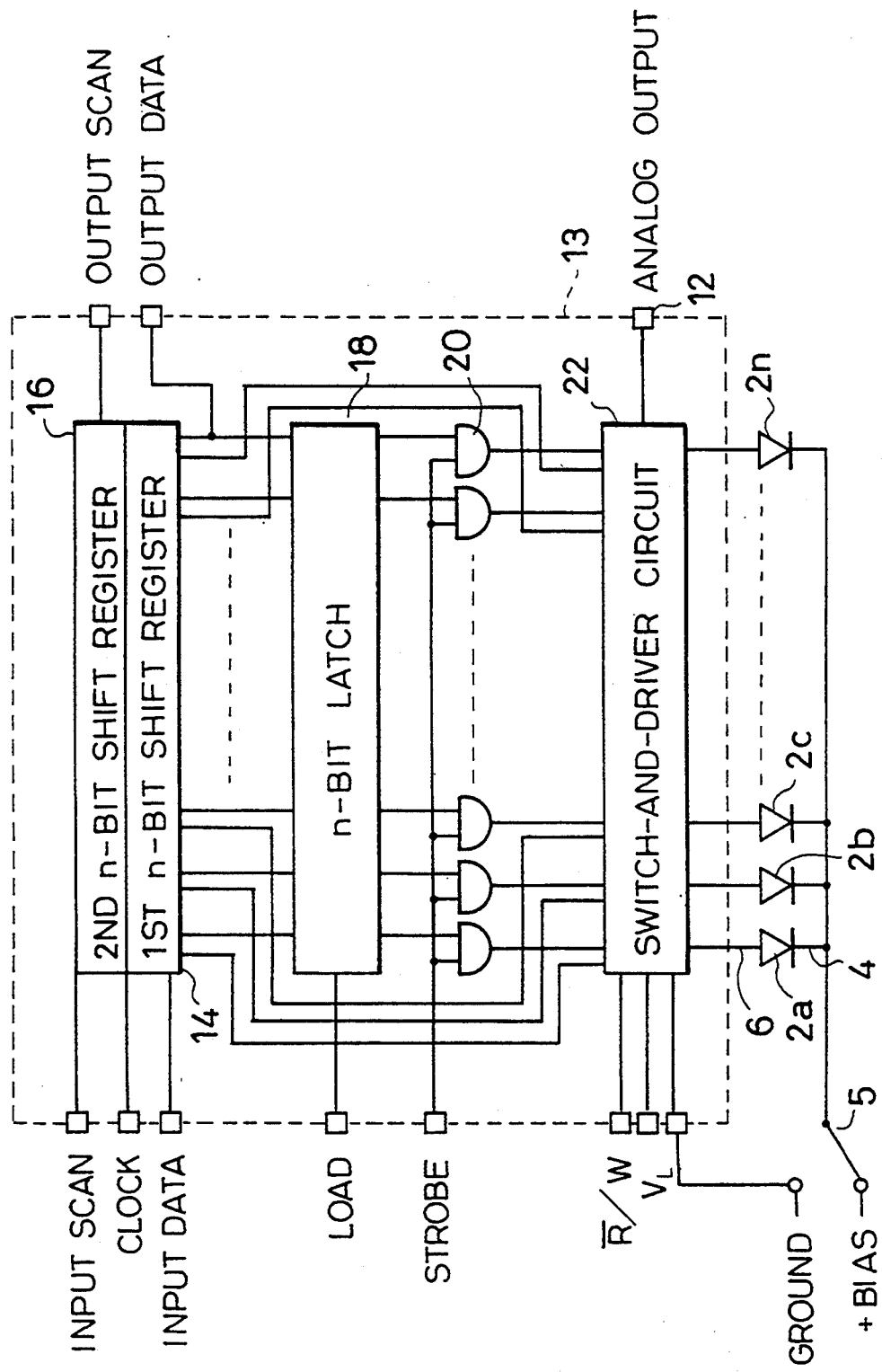
FIG. 3 is a block diagram of one embodiment of the invented control circuit.

Referring to FIG. 3, the control circuit is a monolithic integrated circuit 13 comprising a pair of n-bit shift registers 14 and 16. The first shift register 14 receives an input data signal as its serial input. The second shift register 16 receives an input scan signal as its serial input. Both shift registers 14 and 16 shift their serial inputs internally in synchronization with the same clock signal. The contents of the shift registers 14 and 16 are output as parallel data signals and parallel scan signals, respectively.

The outputs of the final stages of shift registers 14 and 16 are also supplied externally as an output data signal and output scan signal. Multiple control circuits of the type shown in FIG. 3 can be cascaded by coupling the output data and scan signals of one circuit to the input data and scan signals of the next circuit, to control a large LED array.

The parallel data signals output from the first shift register 14 are supplied to an n-bit latch 18, which latches the data under control of a load signal. The latched parallel data signals output by the latch 18 are supplied to respective AND gates 20, which gate the data signals with a strobe signal. Each AND gate 20 receives as inputs the strobe signal and one data signal. The outputs of the AND gates 20 and the parallel scan signals output by the second shift register 16 are supplied to a switch-and-driver circuit 22.

In addition to receiving the outputs of the second shift register 16 and AND gates 20, the switch-and-driver circuit 22 receives a read/write signal $\overline{R/W}$ which is low in read mode and high in write mode, and the LED driving potential $V_L$ which it supplies to the anodes 6 of the LEDs 2 as required in write mode. In read mode, the switch-and-driver circuit 22 can couple the LED anodes 6 either to ground or to an output terminal 12. The cathodes 4 of the LEDs 2 are coupled in common to tile switch 5 that was shown in FIG. 1.

Figure 4:
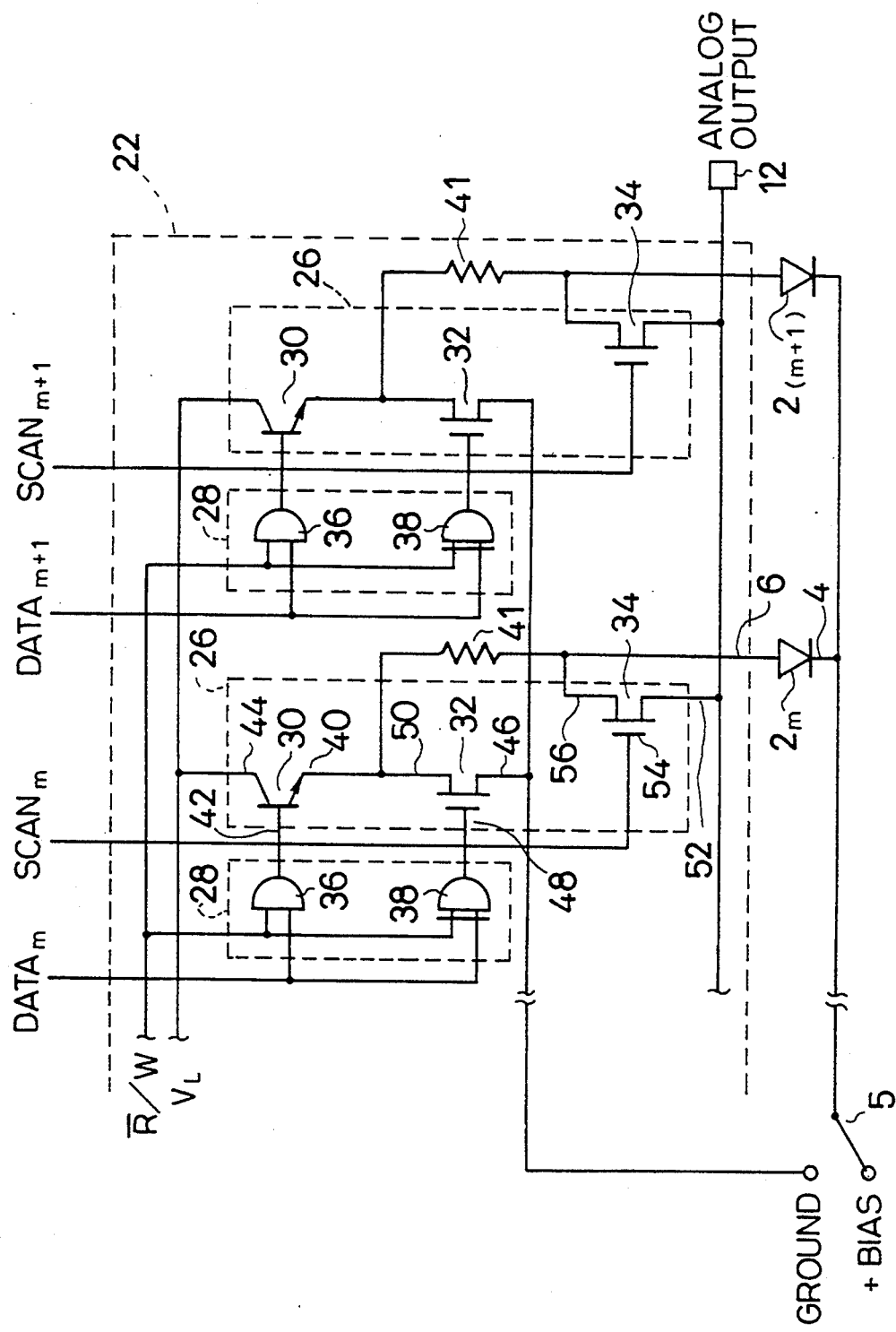
FIG. 4 is a schematic diagram of two stages in the switch-and-driver circuit in FIG. 3.

Referring to FIG. 4, the switch-and-driver circuit 22 comprises n identical stages, one for each LED 2 in the array. Each stage consists of a switching circuit 26 containing tile above-mentioned three switching elements, and a gate circuit 28. The first switching element is a bipolar transistor 30 of the NPN type; the second switching element is a metal-oxide-semiconductor field-effect transistor 32 of tile n-channel (NMOS) type; the third switching element is also an NMOS transistor 34. The gate circuit 28 comprises an AND gate 36 that controls NPN transistor 30, and all exclusive-OR gate 38 that controls NMOS transistor 32.

NPN transistor 30 has its emitter 40 coupled through a resistor 41 to the anode 6 of the LED 2, its base 42 coupled to the output of the AND gate 36, and its collector 44 coupled to receive the LED driving potential $V_L$. NMOS transistor 32 has its source 46 coupled to ground, its gate 48 coupled to the output of the exclusive-OR gate 38, and its drain 50 coupled through resistor 41 to the anode 6 of the LED 2. NMOS transistor 34 has its source 52 coupled to the output terminal 12, its gate 54 coupled to receive a scan signal output by the second shift register 16 in FIG. 3, and its drain 56 coupled directly to the anode 6 of the LED 2.

The AND gate 36 receives as inputs tile read/write signal $\overline{R/W}$ and the strobed data signal output by a corresponding AND gate 20 in FIG. 3. The exclusive-OR gate 38 likewise receives these $\overline{R/W}$ and data signals as its inputs. The data and scan signals of the m-th LED $2m$ are denoted $DATA_m$ and $SCAN_m$ in the drawing.

Next the operation of this control circuit in write mode will be described.

As preparatory steps for write mode, switch 5 is set to couple the cathodes 4 of the LEDs 2 to ground, and the read/write signal $\overline{R/W}$ is set to the high state. The load and strobe signals are initially inactive (low).

The data to be written are shifted into the first shift register 14 in FIG. 3 in synchronization with n clock signals. At the same time the serial input to the second shift register 16 is held low, so that the second shift register 16 is filled with logic-zero values. After n clock signals, the load signal is pulsed high, causing the latch 18 to latch the n bits of data and output them to the AND gates 20. Then the strobe signal is driven high for an appropriate length of time, during which those LEDs 2 corresponding to high data bits are turned on as follows.

Referring to FIG. 4, the scan signals output by the second shift register 16 are all low, so the NMOS transistors 34 are all switched off. The $\overline{R/W}$ signal is high. If the m-th data signal $DATA_m$ is high, then the output of AND gate 36 is high and the output of exclusive-OR gate 38 is low, so NPN transistor 30 is switched on and NMOS transistor 32 is switched off. The anode 6 of LED 2m is thereby coupled to $V_L$ while its cathode 4 is coupled to ground, causing forward current to flow through the LED and light to be emitted.

If $DATA_m$ is low, then the output of AND gate 36 is low and the output of exclusive-OR gate 38 is high, so NPN transistor 30 is switched off and NMOS transistor 32 is switched on. The cathode 4 and anode 6 of LED 2m are now both coupled to ground, so no current flows and no light is emitted.

Thus while the strobe signal is high, each LED is controlled by its corresponding data signal, and none of the LEDs are coupled to the output terminal 12. When the strobe signal goes low, it gates off all the data signals, so all the LEDs 2 are extinguished.

While one line is being written in this way, the data for the next line are being clocked into the first shift register 14. The above operation is repeated cyclically to write succeeding image lines on, for example, a rotating photosensitive drum.

Next the operation in read mode will be described. As preparatory steps, switch 5 is set to couple the cathodes 4 of the LEDs 2 to the positive bias voltage, the read/write signal $\overline{R/W}$ is set to the low state, and the strobe signal is set to the high state. The load signal is initially low.

To read the LED array, a serial data signal comprising a logic-one bit followed by n-1 logic-zero bits is input to the first shift register 14 in FIG. 3. That is, the serial input to the first shift register 14 goes high for one clock period, then low for n-1 clock periods. The single high bit is shifted successively through the first shift register 14 so that in every clock period, the n-bit parallel output of the first shift register 14 contains just one high (logic-one) bit.

The scan signal is identical to the data signal, but leads it by one clock period. A single logic-one bit is thus shifted through the second shift register 16 one clock ahead of the logic-one bit in the first shift register 14.

The load signal is held high, so that the latch 18 is in a transparent state and passes the data output by the first shift register 14 through without alteration. Since the strobe signal is held high, the outputs of the AND gates 20 are identical to the data outputs of the first shift register 14 and latch 18.

(Alternatively, the load signal can be toggled in synchronization with the clock signal, with suitable setup and delay timing, so that every time the contents of the first shift register 14 are shifted, after the new parallel output data have become valid, they are latched in the latch 18.)

The above data, scan, and load signal inputs are repeated cyclically. The first cycle may be used as a dummy cycle, to clear existing data out of the shift registers 14 and 16 before actual read-out begins.

Referring again to FIG. 4, consider the operation of the m-th LED 2m and its associated switching circuit 26 and gate circuit 28 in read mode. Since $\overline{R/W}$ is held low, the output of AND gate 36 is always low and NPN transistor 30 is always switched off. During the n-1 clock periods in which the m-th data signal is low, constituting the above-mentioned second interval for this LED 2m, the output of exclusive-OR gate 38 is also low, so NMOS transistor 32 is switched off and LED 2m is allowed to discharge in response to incident illumination. In the last clock period of this non-charging interval, (the above-mentioned third interval) the scan signal goes high, switching on NMOS transistor 34 and connecting the anode 6 of LED 2m to the output terminal 12. During this clock period, the anode voltage of LED 2m can be read.

In the next clock period (the above-mentioned first interval), the scan signal goes low, turning off NMOS transistor 34, and the data signal goes high. The combination of the high data signal and low $\overline{R/W}$ signal produces a high output from the exclusive-OR gate 38, switching on NMOS transistor 32. The anode 6 of LED 2m is now coupled to ground, charging the capacitance of the LED.

In the next n-2 clock periods the scan and data signals are both low, so NMOS transistors 32 and 34 are both switched off. The above operations are repeated cyclically to read the LEDs in the manner depicted in FIG. 2.

If the positive bias voltage supplied to the cathodes of the LEDs 2 in read mode is, for example, the customary five volts, then the anode voltages of the LEDs in their respective read-out intervals will generally range from a few tens of millivolts to a few hundred millivolts, depending on the intensity with which the LEDs are illuminated. For general signal-processing purposes, the amplifier that amplifies the output signal accordingly requires a voltage gain of less than 100×, which can be easily provided by a single operational amplifier. As noted before, the output signal is substantially constant within the read-out interval of each LED, so an inexpensive operational amplifier with a gain-bandwidth product of only a few megahertz is adequate.

Next a second embodiment of the invented control circuit will be described.

Figure 5:
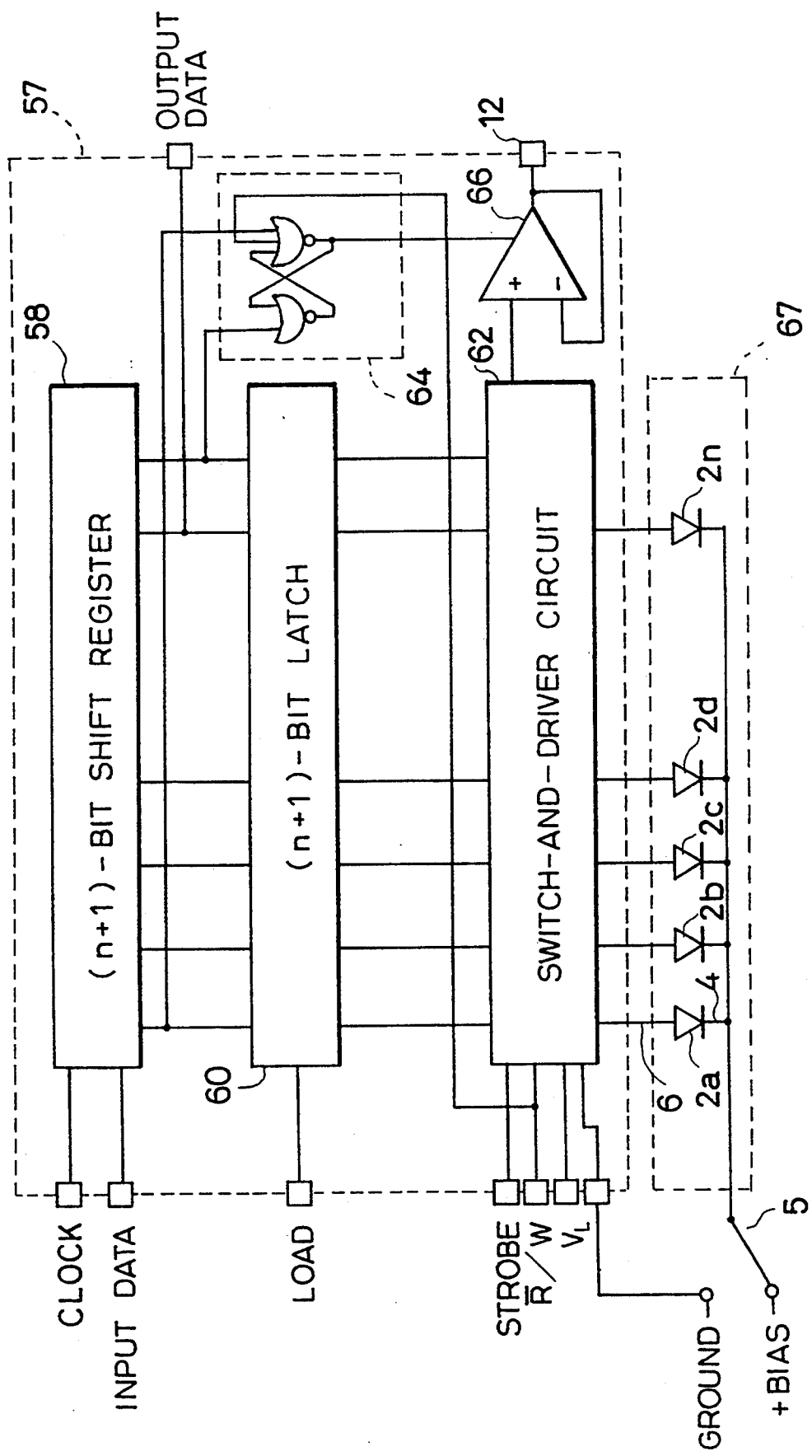
FIG. 5 is a block diagram of another embodiment of the invented control circuit.

Referring to FIG. 5, this control circuit is a monolithic integrated circuit 57 comprising an (n+1)-bit shift register 58, an (n+1)-bit latch 60, a switch-and-driver circuit 62, a chip selector 64, and a buffer amplifier 66.

The shift register 58 receives a clock signal and serial data signal, and provides n+1 parallel data outputs. The latch 60 latches these data outputs in response to a load signal. The switch-and-driver circuit 62 receives strobe and read/write (R/W) signals, as well as the LED driving potential $V_L$.

The chip selector 64 comprises two NOR gates coupled in a well-known flip-flop configuration. The $\overline{R/W}$ signal is supplied to one of these NOR gates as an enable-disable signal, forcing the output of the chip selector 64 to the low state when $\overline{R/W}$ is high. When $\overline{R/W}$ is low, the outputs of the first and last bits positions in the shift register 58 become set and reset signals, placing the output of the chip selector 64 in the high and low states, respectively. The output of the chip selector 64 is an output control signal that turns the buffer amplifier 66 on and off. The buffer amplifier 66 is coupled to the output terminal 12 and provides an amplified output signal.

This control circuit is coupled to the anodes 6 of an array of n LEDs 2, which are integrated in a monolithic semiconductor chip 67. As in FIG. 3, the cathodes 4 of the LEDs 2 are coupled to a switch 5, which can provide either a positive bias voltage or a ground potential.

The output of bit n in the shift register 58 is provided as an external output data signal. When multiple control circuits 57 are cascaded, e.g. to control a plurality of monolithic semiconductor LED arrays 67, the output data terminal of one control circuit is coupled to the input data terminal of the next.

Figure 6:
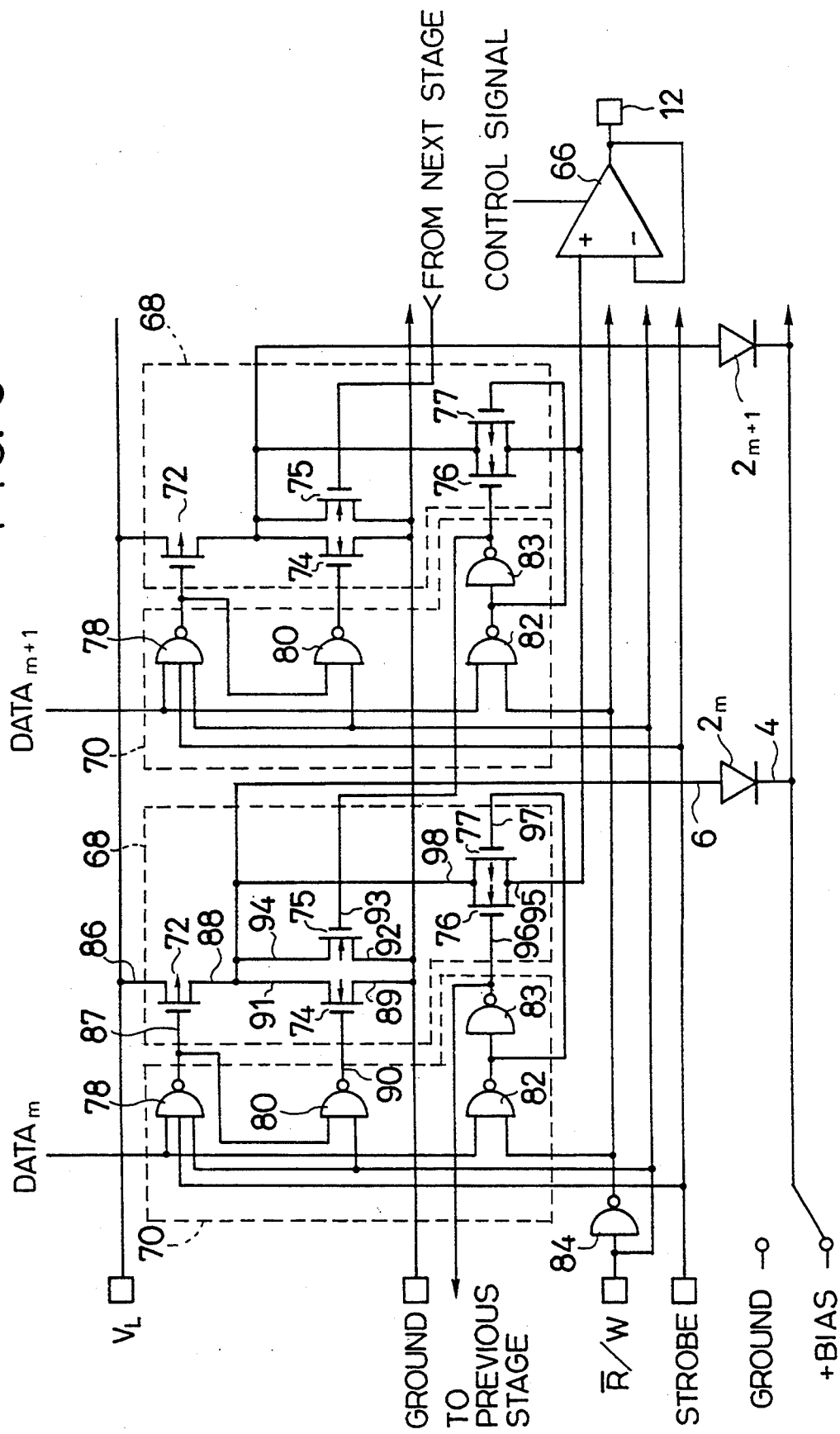
FIG. 6 is a schematic diagram of two stages in the switch-and-driver circuit in FIG. 5.

The switch-and-driver circuit 62 has n+1 stages, of which the first n stages drive the n LEDs 2. The last stage controls the second switching element in the n-th stage. FIG. 6 shows two typical stages among the first n stages, identified as stages m (on the left in FIG. 6) and m+1 (on the right in FIG. 6).

Each stage comprises a switching circuit 68 and gate circuit 70. As before, the switching circuit 68 contains the three switching elements. The first switching element is a metal-oxide-semiconductor field-effect transistor 72 of the p-channel (PMOS) type. The second switching element comprises a pair of NMOS transistors 74 and 75 coupled in parallel. NMOS transistor 74 is used to ground the LED anode 6 in write mode, to extinguish the LED. NMOS transistor 75 is used to charge the capacitance of the LED in read mode. The third switching element is an analog switch comprising an NMOS transistor 76 and PMOS transistor 77 coupled in parallel.

The gate circuit 70 comprises four logic gates: a three-input NAND gate 78, a two-input AND gate 80, a two-input NAND gate 82, and an inverter 83. The switch-and-driver circuit 62 also has an inverter 84 for inverting the $\overline{R/W}$ signal.

The three inputs to the NAND gate 78 are the data signal, the strobe signal, and the (non-inverted) $\overline{R/W}$ signal. The output of the NAND gate 78 controls PMOS transistor 72, and is supplied as one input to the AND gate 80. The other input to AND gate 80 is the (non-inverted) $\overline{R/W}$ signal. The output of AND gate 80 controls the NMOS transistor 74 in the second switching element.

The two inputs to the NAND gate 82 are the data signal and the inverted $\overline{R/W}$ signal. The output of NAND gate 82 controls the PMOS transistor 77 in the third switching element directly, and is inverted by the inverter 83. The inverted output of the inverter 83 controls the NMOS transistor 76 in the third switching element, and the NMOS transistor 75 in the second switching element of the previous stage.

In the m-th stage of the switch-and-driver circuit 62, PMOS transistor 72 has its source 86 coupled to $V_L$, its gate 87 coupled to the output of: NAND gate 78, and its drain 88 coupled to the anode 6 of LED 2m. NMOS transistor 74 has its source 89 coupled to ground, its gate 90 coupled to the output of the AND gate 80 in the same (m-th) stage, and its drain 91 coupled to the anode 6 of LED 2m. NMOS transistor 75 has its source 92 coupled to ground, its gate 93 coupled to the output of the inverter 83 in the next (m+1-th) stage, and its drain 94 coupled to the anode 6 of LED 2m. The source 95 of NMOS transistor 76, which is also the drain of PMOS transistor 77, is coupled to the non-inverting input of the buffer amplifier 66. The gate 96 of NMOS transistor 76 is coupled to the output of the inverter 83, and the gate 97 of PMOS transistor 77 to the output of NAND gate 82. The drain 98 of NMOS transistor 76, which is also the source of PMOS transistor 77, is coupled to the anode 6 of LED 2m.

The (n+1)-th stage (the last stage) of the switch-and-driver circuit 62 is not coupled to any LED, so in this stage transistors 72, 74, 75, 76, 77, NAND gate 78, and AND gate 80 may be omitted. All that is required in this last stage is the NAND gate 82 and inverter 83, to control the NMOS transistor 75 in the second switching element of the preceding (n-th) stage.

In write mode, this second novel control circuit operates as follows.

As preparatory steps for write mode, switch 5 is set to couple the cathodes 4 of the LEDs 2 to ground, and the read/write signal $\overline{R/W}$ is set to the high state. The load and strobe signals are initially inactive (low). Since $\overline{R/W}$ is high, the output of the chip selector 64 is low and the buffer amplifier 66 is switched off.

The data to be written are shifted into the shift register 58 in synchronization with n clock signals, then the load signal is pulsed high, causing the latch 60 to arch the data and output them to the switch-and-driver circuit 62. Then the strobe signal is driven high to light the LEDs 2 corresponding to high data bits.

Referring to FIG. 6, since the $\overline{R/W}$ signal is high, the inverted $\overline{R/W}$ signal is low, so the outputs of the NAND gates 82 are high and the outputs of inverters 83 are low. Accordingly, the NMOS and PMOS transistors 76 and 77 in all third switching elements are switched off, disconnecting the anodes 6 of the LEDs 2 from the buffer amplifier 66. The NMOS transistors 75 in the second switching elements are also switched off by the low outputs of the inverters 83.

When the strobe signal is low, the outputs of the NAND gates 78 are high. Since $\overline{R/W}$ is high, the outputs of the AND gates 80 are also high. Accordingly, PMOS transistors 72 are switched off and the NMOS transistors 74 are switched on, grounding the anodes 6 of the LEDs 2, which are thereby extinguished.

When the strobe signal is high, if the data signal of a particular LED 2 is low, then the output of its NAND gate 78 is high, the output of its AND gate 80 is high, and the LED 2 remains extinguished. If the data signal is high, however, then the outputs of NAND gate 78 and AND gate 80 are low, so PMOS transistor 72 is switched on and NMOS transistor 74 is switched off. The anode 6 of LED 2 is now coupled to $V_L$, and the LED 2 emits light.

In short, notwithstanding the different configuration of the switch-and-driver circuit 62, in write mode this control circuit operates like the one in FIGS. 3 and 4. When the strobe signal is high, each LED 2 is controlled by its corresponding data signal. When the strobe signal is low, all the LEDs 2 are extinguished.

Now the operation in read mode will be described. As preparatory steps, switch 5 in FIG. 5 is set to couple the cathodes 4 of the LEDs 2 to the positive bias voltage, the the strobe signal is set to the low state, and the load signal is set to the high state. Next a serial data signal comprising a logic-one bit followed by all logic-zero bits is clocked through the shift register 58, to clean out the shift-register contents and reset the flip-flop in the chip selector 64. Then the read/write signal $\overline{R/W}$ is driven low, enabling the chip selector 64.

To read the LED array, a similar serial data signal comprising a logic-one bit followed by all logic-zero bits is again input to the shift register 58 in FIG. 5. The one high bit is shifted successively through the shift register 58.

When the logic-one data bit first enters shift register 58, it is output from the first bit position as a set signal to the chip selector 64, causing the output control signal to go high, thus turning on the buffer amplifier 66. The output control signal remains in the high state as the logic-one data is shifted from the second to the n-th bit positions in shift register 58. When the logic-one reaches the (n+1)-th bit position, it is output as a reset signal to the chip selector 64, causing the output control signal to go low, thus turning off the buffer amplifier 66. The buffer amplifier 66 remains turned off until a logic-one bit is again input to shift register 58.

Referring to FIG. 6, since $\overline{R/W}$ is low, the output of NAND gate 78 is high and the output of AND gate 80 is low, so PMOS transistor 72 and NMOS transistor 74 are both switched off. The load signal is high, so the latch 60 is in a transparent state, and the data in the shift register 58 pass through unaltered to the switch-and-driver circuit 62.

The inverted $\overline{R/W}$ signal is high. When the m-th data signal is low, the output of the NAND gate 82 in the m-th stage of the switch-and-driver circuit 62 is high and the output of the inverter 83 is low, turning off NMOS transistor 76 and PMOS transistor 77 and disconnecting the m-th LED 2m from the buffer amplifier 66. When the m-th data signal is high, however, the output of NAND gate 82 is low and the output of inverter 83 is high, turning on NMOS transistor 76 and PMOS transistor 77 and coupling the anode 6 of the m-th LED 2m to the buffer amplifier 66.

When the (m+1)-th data signal is low, the low output of the inverter 83 in the (m+1)-th stage turns off the NMOS transistor 75 in m-th stage. When the (m+1)-th data signal is high, the output of inverter 83 goes high, turning on NMOS transistor 75 in the m-th stage and coupling the anode 6 of the m-th LED 2m to ground.

Figure 7:
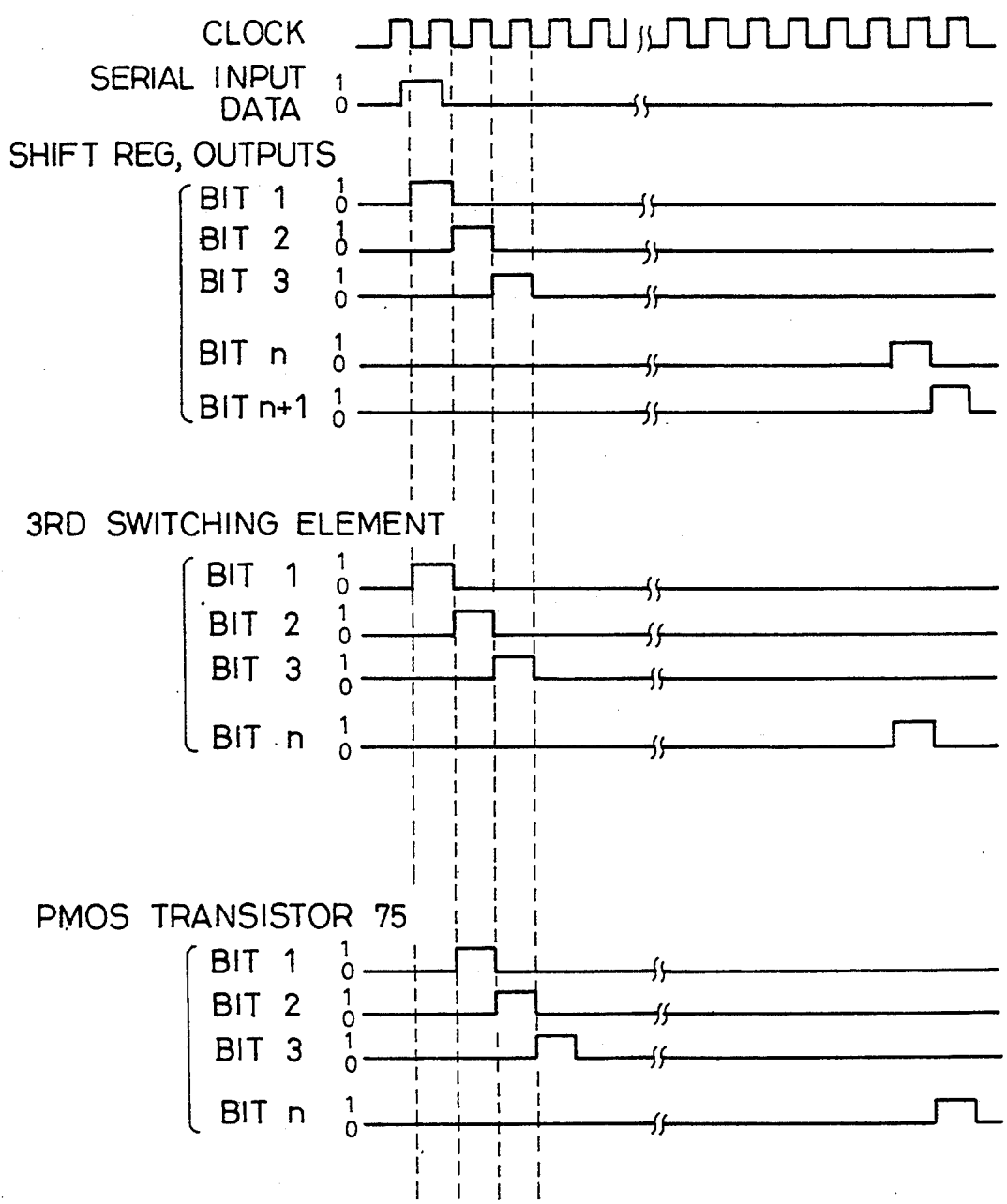
FIG. 7 is a timing diagram illustrating the operation of the circuit in FIGS. 5 and 6 in read mode.

The switch-and-driver circuit 62 accordingly operates as shown in FIG. 7. As the serial input data, comprising a single logic-one bit, is shifted through the shift register 58, the outputs of bit 1, bit 2, bit 3 . . . , bit n, bit n+1 go high in turn.

When the first bit goes high in the shift register 58, it turns on the buffer amplifier 66 and also the third switching element of the first LED. The anode voltage of the first LED is then amplified by the buffer amplifier 66 and output from the output terminal 12.

When the first bit goes low and the second bit goes high in the shift register 58, the buffer amplifier 66 remains on, and the third switching element of the second LED turns on, coupling the anode 6 of the second LED to the buffer amplifier 66 so that its anode voltage can be read out. At the same time, the third switching element of the first LED turns off and the NMOS transistor 75 of the first LED turns on, so the anode 6 of the first LED is charged to ground potential.

This operation continues until the logic-one data has been shifted to the n-th bit position and the anode voltage of the last LED 2n has been read. In the next clock cycle the logic-one is shifted into the (n+1)-th bit position of the shift register 58, generating a reset signal that resets the chip selector 64 and switches off the buffer amplifier 66. In addition, the output of the inverter 83 in the (n+1)-th stage of the switch-and-driver circuit 62 goes high for one clock period, switching on the NMOS transistor 75 in the n-th stage to charge the capacitance of the n-th LED 2n.

When two or more of the control circuits shown in FIGS. 5 and 6 are cascaded to control a large LED array, in read mode a single logic-one bit is input to the shift register 58 in the first control circuit, then shifted sequentially through the shift registers 58 in the succeeding control circuits. The buffer amplifiers 66 in the control circuits are thus switched on and off in turn, so that only one buffer amplifier 66 is active at a time.

An advantage of providing a buffer amplifier 66 in each control circuit is that the analog output signals are amplified in the comparatively noise-free environment inside the integrated circuit 57. After amplification, the signals are strong enough to be transmitted over the traces on a printed wiring board without significant distortion or degradation, so that a high-quality read-out signal is obtained. If necessary, the read-out signal can be further amplified by an external amplifier, not shown in the drawing, prior to analog-to-digital conversion.

Next a modification to the above control circuit 57 will be described. The purpose of this modification is to provide a margin of time between the switching off of the third switching element in the m-th stage of the switch-and-driver circuit 62 on the one hand, and the switching on of the NMOS transistor 75 in the m-th stage and the third switching element in the (m+1)-th stage on the other hand, in read mode. This margin prevents collisions between outputs from different LEDs. It also prevents the capacitance of the (m+1)-th LED from being charged unintentionally by flow of current through the NMOS transistor 75 in the m-th stage and transistors 76 and 77 constituting the third switching elements in the m-th and (m+1)-th stages, should all of these transistors be turned on simultaneously due to switching delays.

Figure 8:
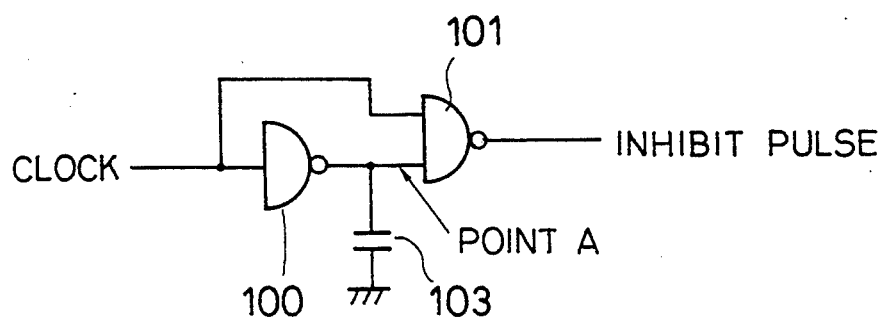
FIG. 8 is a schematic diagram of an inhibiting circuit that can be added to the control circuit in FIGS. 5 and 6.

Referring to FIG. 8, the modification can be effected by providing the control circuit with an inhibiting circuit comprising an inverter 100, a two-input NAND gate 101, and a capacitor 102. The clock signal is supplied to the inverter 100 and to one input of the NAND gate 101. The output of the inverter 100 is coupled to the other input of the NAND gate 101. Opposite terminals of the capacitor 102 are coupled to ground and to a point A between inverter 100 and NAND gate 101. The output of NAND gate 101 is an inhibit pulse that is fed as an extra input to each of the NAND gates 82 in FIG. 6. The output of the NAND gate 82 goes low only when all three of its inputs (the inverted $\overline{R/W}$ signal, the data signal, and the inhibit pulse) are high.

Figure 9:
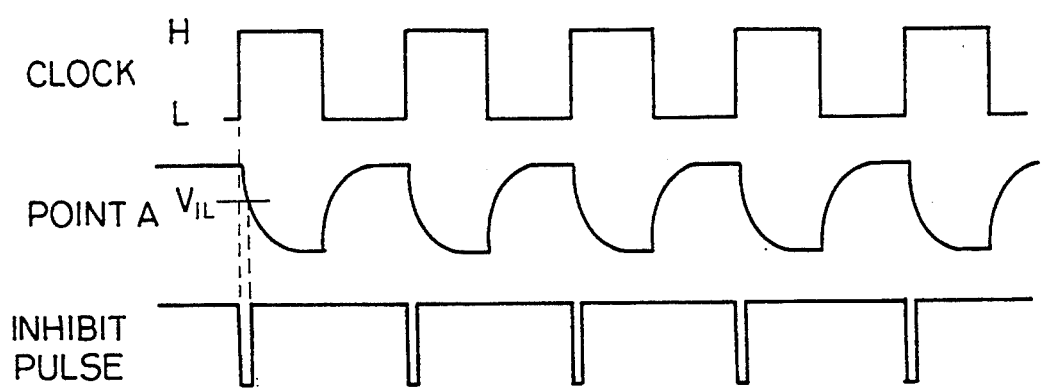
FIG. 9 illustrates waveforms in the inhibiting circuit in FIG. 8.

Referring to FIG. 8, the clock signal, after being inverted by the inverter 100, charges and discharges the capacitor 102 to generate the waveform illustrated at point A. The output of NAND gate 101 is low while the clock signal and the signal at point A are both high, and high at other times. The inhibit pulse accordingly has the waveform shown at the bottom of FIG. 9. The symbol $V_{IL}$ in FIG. 9 denotes the highest voltage recognized by the NAND gate 101 as a low logic level.

Figure 10:
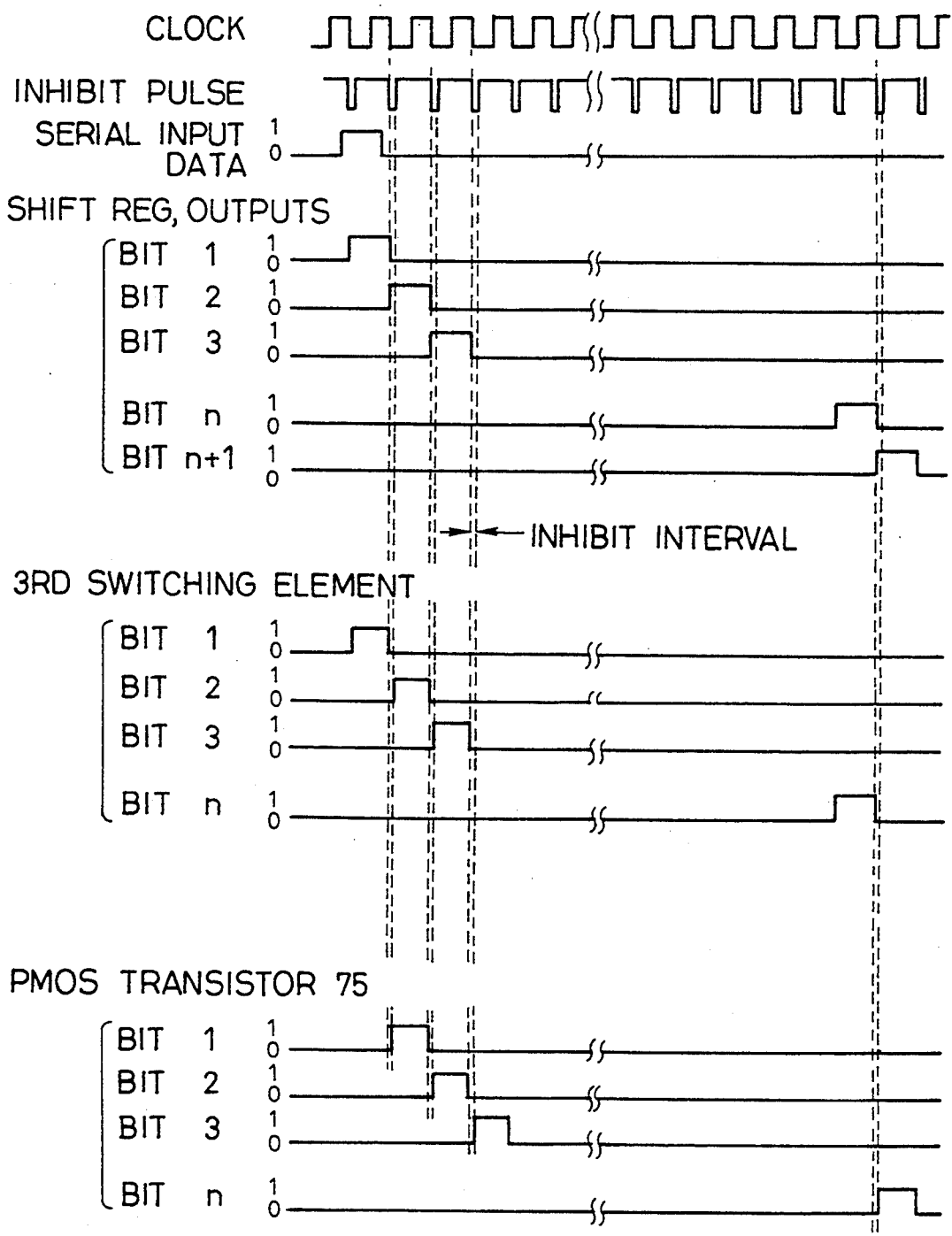
FIG. 10 is a timing diagram illustrating the operation of the circuit in FIGS. 5 and 6 with the inhibiting circuit of FIG. 8, in read mode.

Referring to FIG. 10, in read mode, the outputs of the shift register 58 are the same as in FIG. 7, but the third switching elements and NMOS transistor 75 turn on only when both the inhibit pulse signal and the corresponding data signals are both high. An inhibit interval of time is accordingly left between the switching off of the third switching element in one stage, and the switching on of the NMOS transistor 75 in the same stage and the third switching element in the next stage in read mode.

Figure 11:
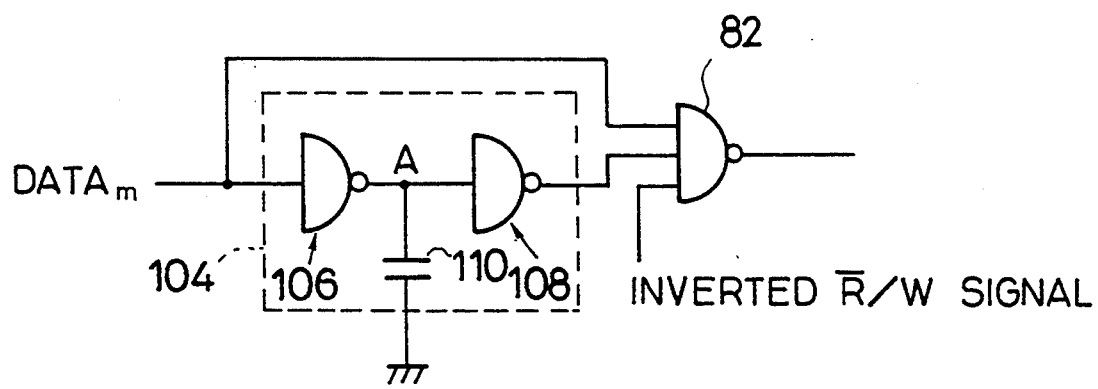
FIG. 11 is a schematic diagram illustrating a delay line that can be added to each stage of the switch-and-driver circuit in FIG. 5.

Referring to FIG. 11, an alternative way to achieve the same effect is to provide a separate delay line 104, comprising a pair of inverters 106 and 108 and a capacitor 110, for each NAND gate 82 in the switch-and-driver circuit 62. The inverters 106 and 108 are coupled in series to a third input of the NAND gate 82. The capacitor 110 is coupled to ground and to a point A between inverters 106 and 108. The data signal from the hatch 60 is provided directly as an undelayed data input to the NAND gate 82, and through the inverters 106 and 108 as a delayed data input to NAND gate 82. The inverted $\overline{R/W}$ signal is also input to NAND gate 82, as in FIG. 6.

Figure 12:
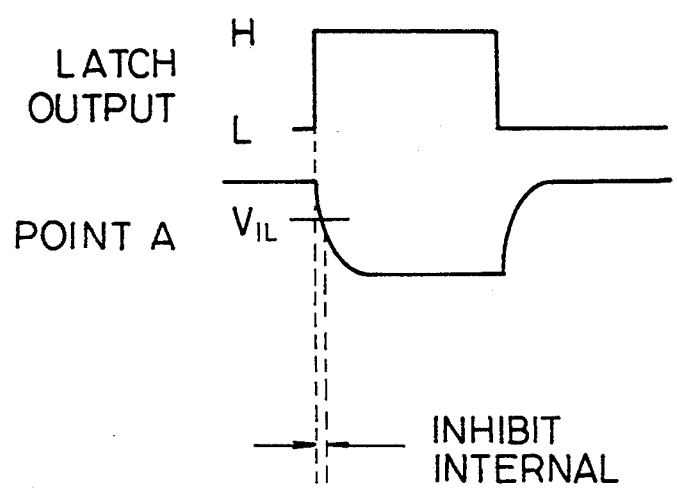
FIG. 12 illustrates waveforms generated by the delay line in FIG. 11.

Referring to FIG. 12, in read mode, when the data signal goes high it produces a waveform as shown at point A. The output of the NAND gate 82 goes low only when the data signal is high and the signal at point A is low, so the fall of the output of the NAND gate 82 is delayed by an inhibit interval created by the delay line 104. This inhibit interval delays the switching on of the third switching element and the NMOS transistor 75, just as in FIG. 10.

Modifications similar to the above can also be made to the control circuit 13 of FIGS. 3 and 4. Also, a buffer amplifier as in FIGS. 5 and 6 can be added to the control circuit of FIGS. 3 and 4. The buffer amplifier should be controlled by a flip-flop that is set by the rise of the first scan signal from the second shift register 16, and reset by the rise of the last (n-th) data signal from the first shift register 14.

Those skilled in the art will recognize that many other modifications can be made without departing from the scope of the invention claimed below.

What is claimed is:

1. A method of reading stored charges from an array of light-emitting diodes used for sensing as well as emitting light, comprising the steps of:
    charging the light-emitting diodes in said array for mutually non-overlapping first intervals of time of equal first lengths;
    allowing said light-emitting diodes to discharge by flow of photocurrent for respective second intervals of time of equal second lengths; and
    detecting anode voltages of said light-emitting diodes during mutually non-overlapping third intervals of time, said third intervals being contained in respective second intervals and comprising final portions of respective second intervals.

2. The method of claim 1, wherein the steps of charging said light-emitting diodes and allowing said light-emitting diodes to discharge are repeated cyclically.

3. The method of claim 2 wherein, for each light-emitting diode in said array, an interval of time is left between the step of detecting and the step of charging.

4. The method of claim wherein, if a first light-emitting diode is followed by a second light-emitting diode in said array, the third interval in which the anode voltage of said second light-emitting diode is detected coincides with the first interval in which said first light-emitting diode is charged.

5. A control circuit for controlling an array of light-emitting diodes in a write mode in which said light-emitting diodes emit light responsive to data, and a read mode in which charges stored in the light-emitting diodes are read to detect illumination received by said light-emitting diodes, comprising:
    a first shift register for serially receiving and shifting said data;
    a latch coupled to receive said data in parallel from said first shift register, latch said data, and generate corresponding data signals;
    an output terminal; and
    a switch-and-driver circuit coupled to control said light-emitting diodes responsive to said data signals; wherein
    each of said light-emitting diodes has a cathode and an anode, said cathode being grounded in said write mode and biased at positive potential in said read mode, so that an electrical capacitance exists between said anode and said cathode in said read mode; and wherein
    said switch-and driver circuit separately comprises, for each light-emitting diode in said array:
    a first switching element coupled to supply a driving potential to the anode of said light-emitting diode, said first switching element being switched on to light said light-emitting diode in said write mode, switched off to extinguish said light-emitting diode in said write mode, and switched off in said read mode;
    a second switching element coupled to supply a ground potential to the anode of said light-emitting diode, said second switching element being switched off to light said light-emitting diode in said write mode, switched on to extinguish said light-emitting diode in said write mode, switched on to charge the capacitance of said light-emitting diode in said read mode, and switched off in said read mode when not charging the capacitance of said light-emitting diode; and
    a third switching element for coupling the anode of said light-emitting diode to said output terminal, said third switching element being switched off in said write mode, switched off when said light-emitting diode is being charged by said second switching element in said read mode, and switched on to read an anode voltage of said light-emitting diode just before said light-emitting diode is charged in said read mode.

6. The control circuit of claim 5, wherein said first switching element is a bipolar transistor.

7. The control circuit of claim 5, wherein said first switching element is a field-effect transistor.

8. The control circuit of claim 5, wherein said second switching element is a field-effect transistor.

9. The control circuit of claim 5, wherein said third switching element is a field effect transistor.

10. The control circuit of claim 5, wherein said third switching element is an analog switch comprising a pair of field-effect transistors of opposite channel types coupled in parallel between the anode of said light-emitting diode and said output terminal.

11. The control circuit of claim 5, also comprising a buffer amplifier for amplifying anode voltages of said light-emitting diodes prior to output of said anode voltages at said output terminal in said read mode.

12. The control circuit of claim 11, wherein:
    said first shift register stores at least a first bit and a last bit, data being shifted from said first bit toward said last bit; and said control circuit also comprises a chip selector for switching said buffer amplifier on responsive to said first bit, and off responsive to said last bit.

13. The control circuit of claim 12, wherein:
said array contains N light-emitting diodes, N being a positive integer; and
said first shift register stores N+1 bits of data.

14. The control circuit of claim 5, also comprising:
a second shift register for serially receiving and shifting a scan input, and generating a plurality of scan signals, each third switching element in said switch-and-driver circuit being controlled by a respective one of said scan signals.

15. The control circuit of claim 14, wherein said switch-and-driver circuit 22 receives a read/write signal for selecting said read mode and said write mode, and separately comprises, for each light-emitting diode in said array:
a first logic gate for controlling said first switching element responsive to said read/write signal and one of said data signals; and
a second logic gate for controlling said second switching element responsive to said read/write signal and said one of said data signals.

16. The control circuit of claim 15, wherein said first logic gate is all AND gate and said second logic gate is an exclusive OR gate.

17. The control circuit of claim 15, comprising a plurality of third logic gates for receiving a strobe signal that controls durations during which said light-emitting diodes can emit light in said write mode, and gating outputs of said latch, responsive to said strobe signal, prior to input to said switch-and-driver circuit.

18. The control circuit of claim 5, wherein said second switching element comprises a pair of transistors coupled in parallel between the anode of said light-emitting diode and said ground potential, said pair including a first transistor for extinguishing said light-emitting diode in said write mode, and a second transistor for charging the capacitance of said light-emitting diode in said read mode.

19. The control circuit of claim 18, wherein:
said array contains N light-emitting diodes, N being a positive integer;
said first shift register stores N+1 bits of data; and
said switch-and driver circuit has:
a first N stages, each with a first switching element as described in claim 5, a second switching element as described in claim 18, and a third switching element as described in claim 5; and
a last stage for controlling the second transistor of said second switching element in an Nth state among said first N stages.

20. The control circuit of claim 19, wherein said switch-and-driver circuit 62 receives a read/write signal for selecting said read mode and said write mode, and a strobe signal for controlling durations during which said light-emitting diodes can emit light in said write mode, and wherein each individual stage among said first N stages separately comprises:
a fourth logic gate for controlling said first switching element in said individual stage responsive to said read/write signal, said strobe signal, and one of said data signals;
a fifth logic gate for controlling said first transistor in said second switching element in said individual stage, responsive to said read/write signal and an output of said fourth logic gate; and
a sixth logic gate for controlling said third switching element in said individual stage and said second transistor in said second switching element in a preceding stage among said First N stages, responsive to said read/write signal and said one of said data signals.

21. The control circuit of claim 20, wherein said fourth logic gate is a NAND gate.

22. The control circuit of claim 20, wherein said fifth logic gate is an AND gate.

23. The control circuit of claim 20, wherein said sixth logic gate is a NAND gate.

24. The control circuit of claim 20, further comprising an inhibiting circuit for producing inhibit pulses, which are supplied to each said sixth logic gate to delay switching-on of said third switching elements.

25. The control circuit of claim 24, wherein said inhibiting circuit receives a clock signal and comprises:
a NAND gate having a first input terminal and a second input terminal, said clock signal being received at said first input terminal;
an inverter coupled to invert said clock signal, and supply an inverted clock signal to the second input terminal of said NAND gate; and
a capacitor coupled to the second input terminal of said NAND gate.

26. The control circuit of claim 20, also comprising, for each said sixth logic gate, a delay line for delaying the data signal input to said sixth logic gate, said sixth logic gate receiving both delayed and undelayed data signals.

* * * * *